(12) United States Patent
Keating

(10) Patent No.: US 8,568,086 B2
(45) Date of Patent: Oct. 29, 2013

(54) COOLING SYSTEM

(75) Inventor: Timothy P. Keating, Kenley (GB)

(73) Assignee: Rolls-Royce PLC, London (GB)

( * ) Notice: Subject to any disclaimer, the term of this patent is extended or adjusted under 35 U.S.C. 154(b) by 595 days.

(21) Appl. No.: 12/897,106

(22) Filed: Oct. 4, 2010

(65) Prior Publication Data
US 2011/0083417 A1 Apr. 14, 2011

(30) Foreign Application Priority Data

Oct. 14, 2009 (GB) .................................. 0917953.2
Mar. 3, 2010 (GB) .................................. 1003525.1

(51) Int. Cl.
F01D 5/08 (2006.01)
(52) U.S. Cl.
USPC .................... 415/115; 416/97 R; 416/90 R
(58) Field of Classification Search
USPC .......... 415/115, 116; 416/90 R, 91, 92, 90 A, 416/93 A, 94, 97 R
See application file for complete search history.

(56) References Cited

U.S. PATENT DOCUMENTS

2009/0202357 A1* 8/2009 Stern .......................... 416/97 R

FOREIGN PATENT DOCUMENTS

EP 2 090 765 A2 8/2009

OTHER PUBLICATIONS

British Search Report dated Feb. 5, 2010 issued in British Patent Application No. 0917953.2.

* cited by examiner

Primary Examiner — Dwayne J White
(74) Attorney, Agent, or Firm — Oliff & Berridge, PLC

(57) ABSTRACT

A cooling system for an open rotor gas turbine engine is provided. The system comprises an engine exhaust, and a row of open rotor propeller blades located rearwardly of the exhaust such that hot exhaust gases impinge on the propeller blades. Each blade has an internal cooling network through which cooling air flows to cool the blade in respect of the hot exhaust gases. Each blade also has one or more intakes which provide cooling air to the cooling network. The or each intake is located radially outwardly of the position of impingement of the hot exhaust gas on the blade.

15 Claims, 3 Drawing Sheets

COOLING SYSTEM

FIELD OF THE INVENTION

The present invention relates to a cooling system for an open rotor gas turbine engine.

BACKGROUND OF THE INVENTION

In current gas turbine engines, the provision of cooling air to components downstream of the combustor is commonplace. The cooling air can allow components to operate in allowable material temperature ranges. In the case of turbine blade cooling, the air is bled from the compressor stage using a series of feed pipes and valves.

In turboprop or open rotor gas turbine engines, a row of rows of propeller blades are mounted forward of the engine or rearward of the engine. Rearward mounting can provide aerodynamic and operational advantages over forward mounting, but a problem with the arrangement is that hot exhaust gases from the engine have to traverse the propeller blades on being expelled from the engine.

In one configuration, the exhaust gases are expelled from the engine such that they impinge on the root regions of the propeller blades. As the exhaust gas can reach temperatures of about 750 K, the blades typically require cooling at the root and hub to avoid material fatigue and failure, as well as to avoid damage to the lubrication system of support bearings.

One option for cooling the blades is to supply a flow of air bled from the compressor of the engine to internal cooling networks in the root regions of the blades. However, air bled from the compressor has a detrimental effect on compressor performance. Further, the network of feed pipes and valves which the supply requires adds weight to the engine. Also, the air has to cross a rotating boundary to reach the rear rotors.

US 2009/0202357 proposes having an annular cooling flow nozzle radially inward of an annular exhaust nozzle. Exhaust gas from the exhaust nozzle impinges on a row of propeller blades. Cooling air, which may be bled from the compressor, is directed by the cooling flow nozzle essentially under the annular exhaust gas flow to enter each blade at an intake at the blade root section.

There is a need for improvements to known cooling arrangements for open rotor gas turbine engines.

SUMMARY OF THE INVENTION

Accordingly, a first aspect of the invention provides a cooling system for an open rotor gas turbine engine, the system comprising:
an engine exhaust, and
a row of open rotor propeller blades located rearwardly of the exhaust such that hot exhaust gases impinge on the propeller blades;
wherein each blade has an internal cooling network through which cooling air flows to cool the blade in respect of the hot exhaust gases, and each blade has one or more intakes which provide cooling air to the cooling network, the or each intake being located radially outwardly of the position of impingement of the hot exhaust gas on the blade.

Advantageously, by having the or each intake radially outwardly of the position of impingement of the hot exhaust gas on the blade, ambient air, rather than compressor air, can be used to cool the blade. As ambient air is substantially cooler than compressor air, a smaller quantity of cooling air is required to obtain a similar cooling effect. Further, the problem of reduced compressor performance can be avoided.

Also, there is no need for a network of feed pipes and valves from the compressor, and the cooling air does not have to cross a rotating boundary.

The system may include any one or any compatible combination of the following optional features.

Preferably the or each intake is radially located such that substantially only ambient air is taken in at the intake, ie there is substantially no exhaust gas in the cooling air. However, preferably the or each intake is radially located as far inward as possible to reduce drag and performance loss caused by the presence of the intake. Thus there is generally an optimal radial location for the or each intake dictated by these competing objectives.

The or each intake may be located at the leading edge of the respective blade. This location allows the system to utilise the ram effect of the blade rotation and aircraft forward motion to force air into the blade.

However, the or each intake may be at a non-leading edge location, for example on a shroud at the foot of the blade. Such a location may not benefit to such an extent from the ram effect, but it may have less negative impact on drag and performance.

Typically, each blade has one or more outlets from the respective cooling network at an external surface of the blade. For example, the or each outlet may be located at the trailing edge or at the suction surface of the blade. Such an arrangement can provide a pressure difference between the or each intake and the or each outlet which draws the cooling air through the cooling network. As the external pressure can be particularly low at the trailing edge and at the suction surface, these outlet positions are effective in combination with a non-leading edge intake location.

Preferably, each blade has a plurality of outlets from the respective cooling network at spaced locations along the length of the blade. More preferably, the spaced locations are along the trailing edge of the blade. This arrangement allows the expelled cooling air to fill in the trailing wake of the blade, which can reduce noise generated by the blade.

The cooling system may have a central plenum which receives and combines cooling air from the inlets of the blades, and returns respective portions of the combined cooling air to the cooling networks of the blades. Combining the cooling air in the central so plenum region helps to remove the threat of single point failure that accidental blockage of the or each inlet of a blade might otherwise cause.

A branch of the cooling network for carrying heated cooling air may extend along the leading edge of the blade. In this way, heat from the exhaust gases can be transferred is to the leading edge to provide an anti-ice function for the blade.

The blade may comprise a cuff surrounding at least a part of the radially inward part of the blade. The cooling network may be formed between the blade and the cuff. The cooling network may be formed by channels either in a blade surface or a cuff surface.

An insulating layer may be located between the cuff and the blade. The cooling network may be formed by the insulating layer.

The blade may comprise a deflector located on the blade in the region between the hot exhaust gas and ambient air flow to divert hot gases away from the intake.

A further aspect of the invention provides a propeller blade of the cooling system of the first aspect. The propeller blade may have any one or any compatible combination of relevant optional features of the cooling system.

A further aspect of the invention provides an open rotor gas turbine engine having a cooling system of the first aspect. The engine may have any one or any compatible combination of optional features of the cooling system.

BRIEF DESCRIPTION OF THE DRAWINGS

Embodiments of the invention will now be described by way of example with reference to the accompanying drawings in which.

DETAILED DESCRIPTION

Figure 1:
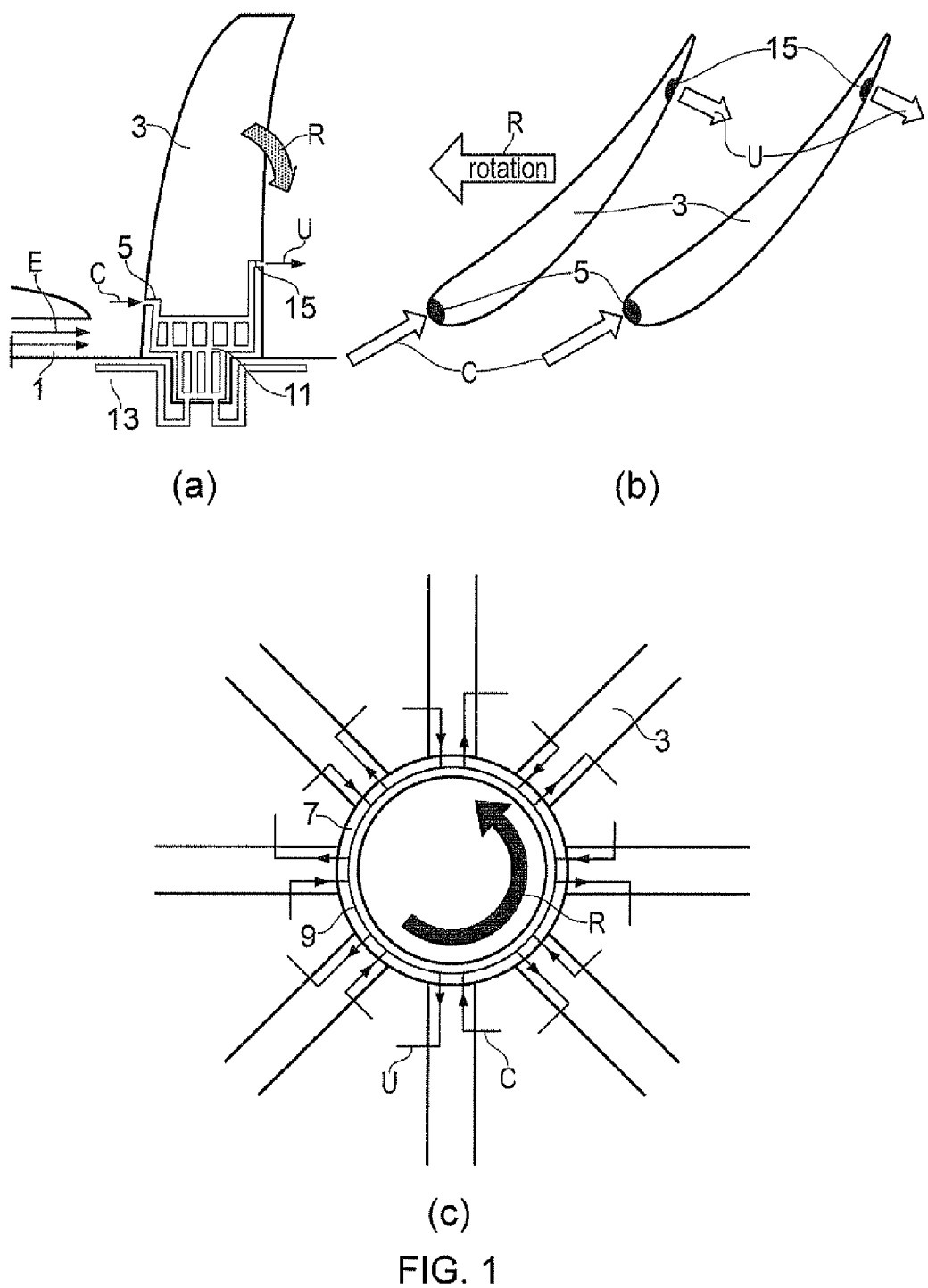
FIG. 1 shows schematically (a) a longitudinal cross-section through part of an open rotor engine having a cooling system according to a first embodiment of the present invention, (b) a transverse cross-section through two adjacent propeller blades of the engine, and (c) a transverse cross-section through the engine.

FIG. 1(a) shows schematically a longitudinal cross-section through part of an open rotor engine having a cooling system according to a first embodiment of the present invention. An annular exhaust nozzle 1 expels hot exhaust gases (arrows E) from the engine. These gases impinge at the base of a row of propeller blades 3.

FIG. 1(b) shows schematically a transverse cross-section through two adjacent propeller blades 3 of the row. Each blade has a small intake hole 5 at the blade's leading edge just above the position at which the hot exhaust gases impinge on the blade. The rotation of the blade (arrows R) and aircraft forward motion produce a ram effect that forces ambient cooling air (arrows C) into the intake.

FIG. 1(c) shows schematically a transverse cross-section through the engine at the blades 3. The cooling air from the intake hole 5 is delivered to a central plenum 7 at the hub of the blades. In the plenum, the cooling air is mixed with cooling air received from the intake holes of the other blades in a communal stream 9, and then distributed into respective networks 11 of cooling passages formed in each blade. The networks cool the root of each blade against the impinging hot exhaust gases. The arrangement safeguards against obstructions, meaning that if the intake hole of one of the blades becomes blocked, the intake holes of the other blades continue to provide cooling air to the network of the blocked blade. The cooling air can also cool the cowl area 13 of the engine exposed to the hot exhaust gases, and the lubrication system of support bearings (not shown) for the blades.

The used cooling air (arrows U) is then exhausted through an outlet hole 15 at the suction surface near the trailing edge of each blade 3, and generally at a similar or higher region of the blade relative to the intake hole 5. The location of the outlet hole provides suction for the cooling air, helping to draw air through the cooling system. Overall, the system uses the natural pressure differences across the blades to "pump" ambient cooling air through the blades and other parts of the engine heated by the exhaust gases.

Advantages of the System are:

The location of the intake hole 5 at a relatively low radius reduces drag and performance losses caused by the hole.

The cooling air has a short distance to travel, leading to small pressure losses compared to compressor bled systems.

Relative to a compressor bled system, less pipework is needed, reducing the weight of the system.

The feed air is cooler than compressor air, so less is required, allowing smaller passages to be used.

The system can be passive, not requiring electrical systems or valves.

The "sharing" of cooling air in the central plenum 7 reduces the likelihood of single point failure.

Figure 2:
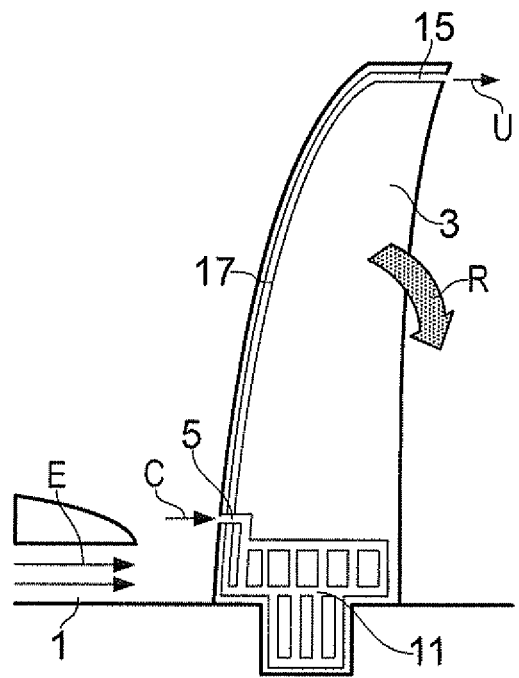
FIG. 2 shows schematically a longitudinal cross-section through part of an open rotor engine having a cooling system according to a second embodiment of the present invention.

FIG. 2 shows schematically a longitudinal cross-section through part of an open rotor engine having a cooling system according to a second embodiment of the present invention. Features common to the first and second embodiments have the same reference numbers. In the second embodiment, a branch 17 of the cooling network carries heated cooling air along the leading edge of the blade to exit the blade at a higher outlet hole 15. The heated cooling air helps to avoid ice build up along the leading edge.

Figure 3:
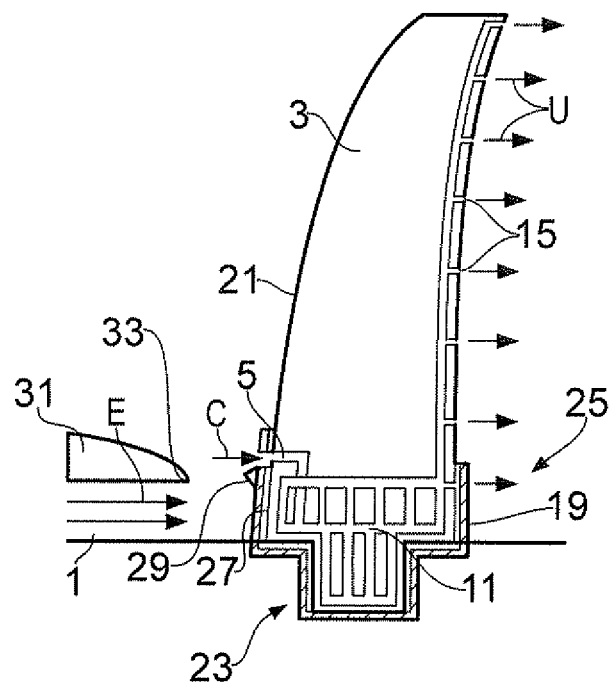
FIG. 3 shows schematically a longitudinal cross-section through part of an open rotor engine having a cooling system according to a third embodiment of the present invention.

FIG. 3 shows schematically a longitudinal cross-section through part of an open rotor engine having a cooling system according to a third embodiment of the present invention. Features common to the first and third embodiments have the same reference numbers. In the third embodiment, used cooling air is released at various heights from a plurality of outlet holes 15 spaced along the trailing edge of the blade. This helps to fill in the blade's trailing wake, which in turn can assist in reducing noise generated by the wake.

Figure 4:
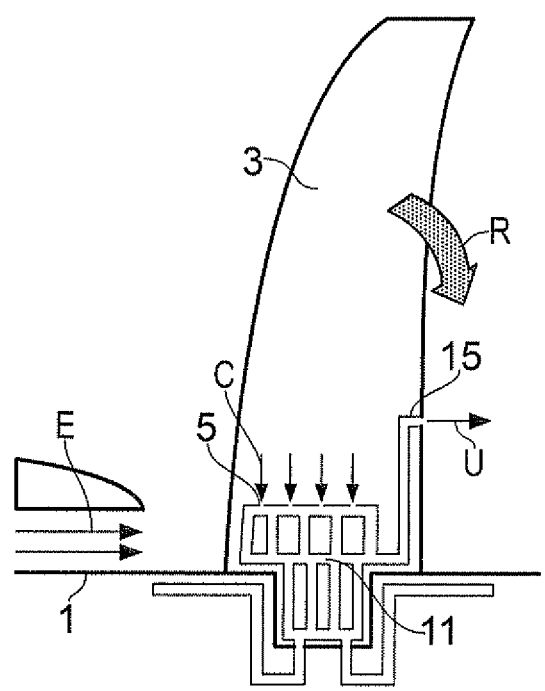
FIG. 4 shows schematically a longitudinal cross-section through part of an open rotor engine having a cooling system according to a fourth embodiment of the present invention.

FIG. 4 shows schematically a longitudinal cross-section through part of an open rotor engine having a cooling system according to a fourth embodiment of the present invention. Features common to the first and fourth embodiments have the same reference numbers. In the fourth embodiment, the outlet hole 15 is at a higher radius on the suction surface which draws air more powerfully through the cooling system. With sufficient suction, the leading edge ram air intake hole of the first embodiment can be avoided, and instead intake holes can be provided at other locations radially outward of the position at which the hot exhaust gases impinge on the blade. For example, as shown in FIG. 4, intake holes 5 can be located on the top edge of a shroud of the blade where they are less susceptible blockage and cause less drag and performance losses.

Referring back to FIG. 3, the propeller blade of the present invention may also comprise a cuff 19 which surrounds at least a leading edge region 21 of the blade near to a blade root 23. As shown the cuff 19 surrounds the entire blade root 23 and lower portion of the blade 25 and particularly the portion subject to the hot exhaust gases E. The cuff is metallic and the blade is a composite material such as carbon fibre reinforced plastic although other materials and combinations of materials are possible.

The cuff can be secured to the blade and rotor (not show) to anchor the blade to the rotor during use. An insulating material 27 is disposed between the cuff and blade which helps to prevent overheating of the blade material. The cuff extends radially outwardly along the length of the blade and stops before the intake holes 5. In this embodiment, the cooling air networks 11 are formed by and are generally located between the cuff and blade and therefore help prevent overheating of the blade and cuff. The cooling network 11 may be formed by channels either in the respective blade surface or cuff surface.

Where there is an insulating layer 27 the cooling network 11 may be formed in or by the insulating layer 27 at least in part or wholly.

The cuff may extend radially outwardly of the intake holes 5. Hot gases E exhausted from the turbine are intended to impinge on the cuff, which when made of metal will be more heat resistant than the blade material.

The cuff 19 or blade 3 can further comprise a deflector 29 which is positioned to separate the ambient air flow C and the hotter working exhaust gases E. The deflector 29 is positioned radially inwardly of the intake holes 5 and generally adjacent or radially outwardly of the radially outer periphery of an outlet 33 of an exhaust nozzle fairing 31. The deflector 29 located on the blade in the region between the hot exhaust gas and ambient air flow C to divert hot gases away from the intakes 5. The deflector is generally triangular in section as shown and with an apex pointing upstream.

Although the position of the intake holes 5 are described as being located radially outwardly of the position of impingement of the hot exhaust gas on the blade, it should be appreciated that intake holes 5 are preferably located where the ambient air is sufficiently cool for its purpose at all aircraft and/or engine operating points. Generally this might be at approximately the radial height of the radially outer periphery of the outlet 33 of the exhaust nozzle fairing 31. However, it should be remembered that convergent or divergent exhaust nozzles as well as the distance between exhaust outlet and blade all influence the radial position of the intake holes 5.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A cooling system for an open rotor gas turbine engine, the system comprising:
   an engine exhaust, and
   a row of open rotor propeller blades located rearwardly of the exhaust such that hot exhaust gases impinge on the propeller blades;
   wherein each blade has an internal cooling network through which cooling air flows to cool the blade in respect of the hot exhaust gases, and each blade has one or more intakes which provide cooling air to the cooling network, the or each intake being located radially outwardly of the position of impingement of the hot exhaust gas on the blade.

2. A cooling system according to claim 1, wherein the or each intake to the cooling network of each blade is located at the leading edge of the blade.

3. A cooling system according to claim 1, wherein each blade has one or more outlet from the respective cooling network at an external surface of the blade.

4. A cooling system according to claim 3, wherein the or each outlet is located at the trailing edge or at the suction surface of the blade.

5. A cooling system according to claim 3, wherein each blade has a plurality of outlets from the respective cooling network at spaced locations along the length of the blade.

6. A cooling system according to claim 1 further comprising a central plenum which receives and combines cooling air from the inlets of the blades, and returns respective portions of the combined cooling air to the cooling networks of the blades.

7. A cooling system according to claim 1, wherein the cooling network has a branch which carries heated cooling air and extends along the leading edge of the blade.

8. A cooling system according to claim 1, wherein the blade comprises a cuff surrounding at least a part of the radially inward part of the blade.

9. A cooling system according to claim 8, wherein the cooling network is formed between the blade and the cuff.

10. A cooling system according to claim 9, wherein the cooling network is formed by channels either in a blade surface or a cuff surface.

11. A cooling system according to claim 8, wherein an insulating layer is located between the cuff and the blade.

12. A cooling system according to claim 11, wherein the cooling network is formed by the insulating layer.

13. A cooling system according to claim 11, wherein the blade comprises a deflector located on the blade in the region between the hot exhaust gas and ambient air flow to divert hot gases away from the intake.

14. A propeller blade of the cooling system according to claim 1.

15. An open rotor gas turbine engine having a cooling system according to claim 1.

* * * * *